Jan. 23, 1945.  H. W. WILLIAMS ET AL  2,367,988
ELEVATOR DISPATCHING SYSTEM
Filed Jan. 14, 1942   5 Sheets-Sheet 1
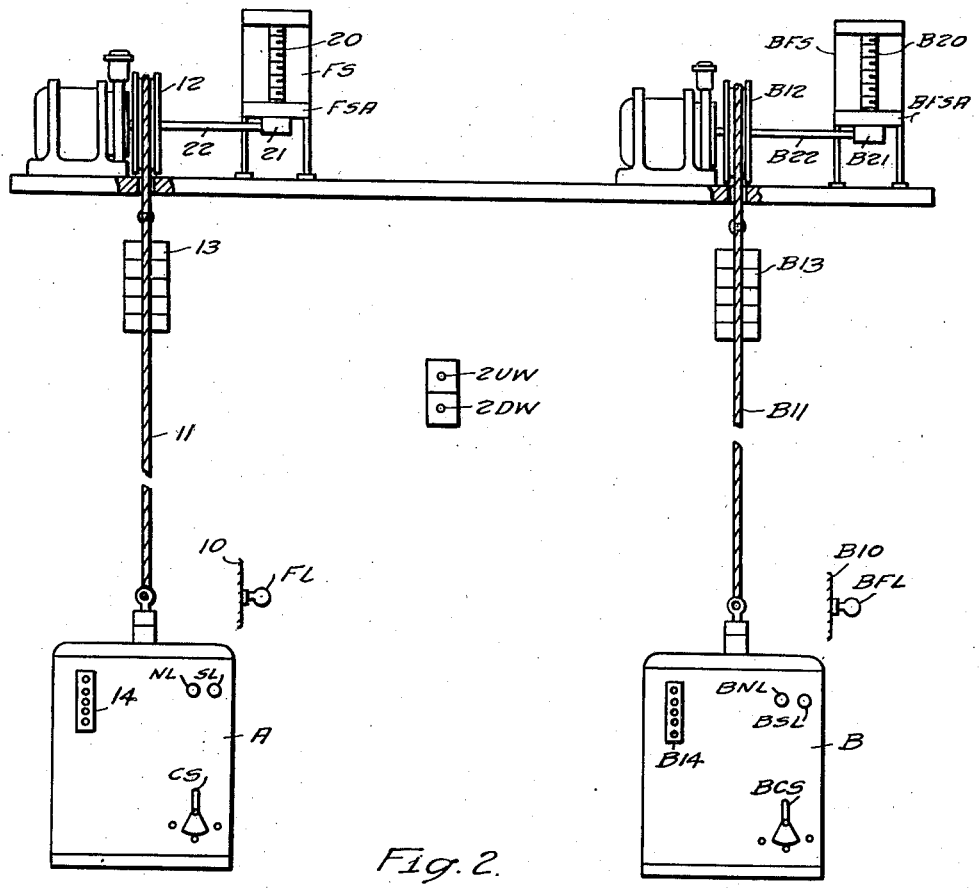
Fig.1.
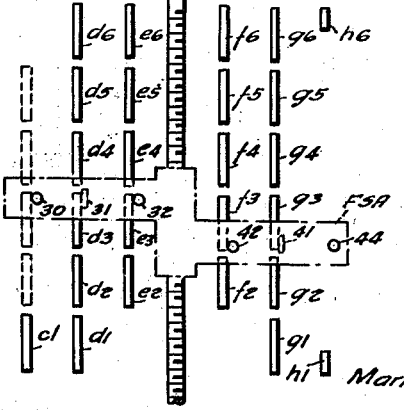
Fig.2.
INVENTORS
Harold W. Williams,
Mark L. Mount and Arvid M. Nelson.
BY
ATTORNEY Jan. 23, 1945. H. W. WILLIAMS ET AL 2,367,988
ELEVATOR DISPATCHING SYSTEM
Filed Jan. 14, 1942 5 Sheets-Sheet 5

WITNESSES:
E.A. M?Closkey.
Birney Hines

INVENTORS
Harold W. Williams
Mark L. Mount and Arvid M. Nelson.
BY
ATTORNEY

Patented Jan. 23, 1945

2,367,988

UNITED STATES PATENT OFFICE 2,367,988

ELEVATOR DISPATCHING SYSTEM

Harold W. Williams, Nutley, Mark L. Mount, Westfield, and Arvid M. Nelson, Jersey City, N. J., assignors to Westinghouse Electric Elevator Company, Jersey City, N. J., a corporation of Illinois Application January 14, 1942, Serial No. 426,678

11 Claims. (Cl. 177—336)

Our invention relates to elevator dispatching systems and more particularly to dispatching systems for giving starting signals at a single terminal in two car installations.

One object is to provide a two car dispatching system which shall have a small number of parts and shall be simple and inexpensive to install, operate and maintain in operation.

Another object is to provide a dispatching system which will keep the cars well spaced apart at all times where a system embodying a definite timing interval would tend to keep the cars operating close together on heavy traffic and to operate too often in light traffic.

A further object is to provide a dispatching system without a motor driven timing mechanism which will cause the cars to serve the waiting passengers effectively.

It is also an object of our invention to provide a dispatching system for two car single installations in which the time a car remains at the dispatching floor will depend upon the amount of traffic and the position of the other car rather than upon a definite time interval.

For a better understanding of our invention reference may be had to the accompanying drawings in which:

Figure 1 is a diagrammatic representation of an elevator system embodying our invention;

Fig. 2 represents the arrangement of the contact segments and brushes pertaining to our invention on one of the floor selectors in Fig. 1;

Figure 3:
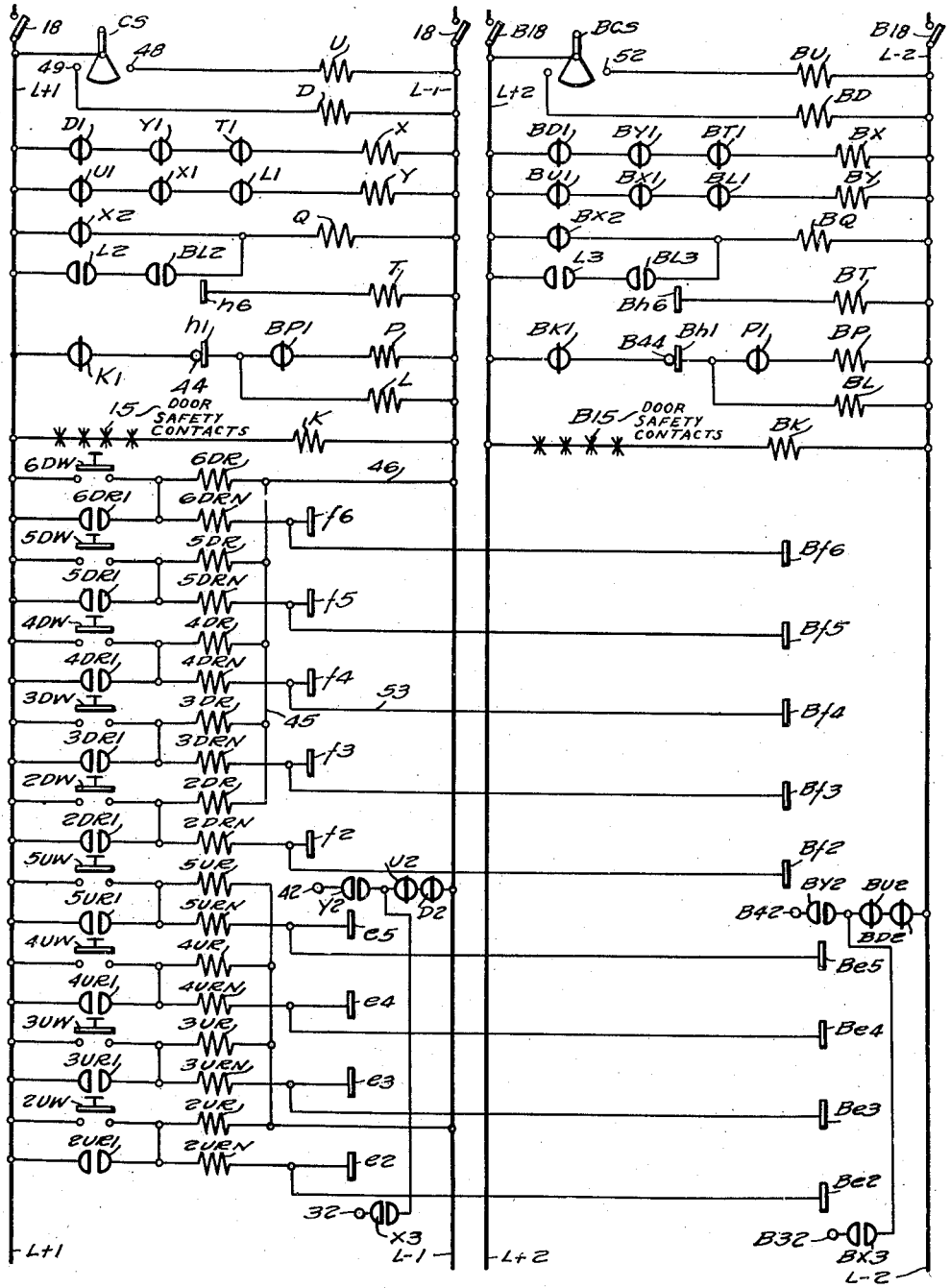
Figure 3A:
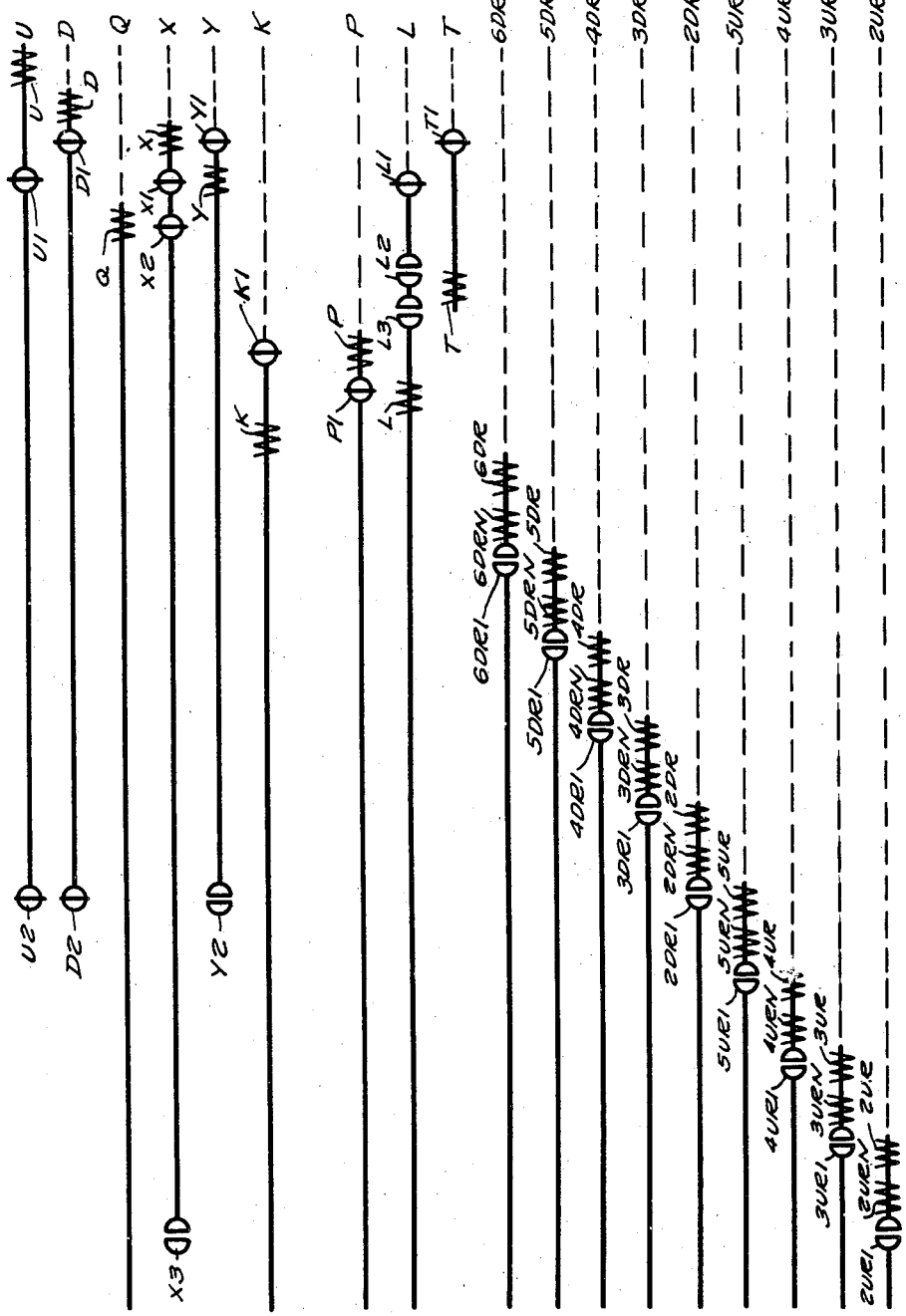
Figure 4:
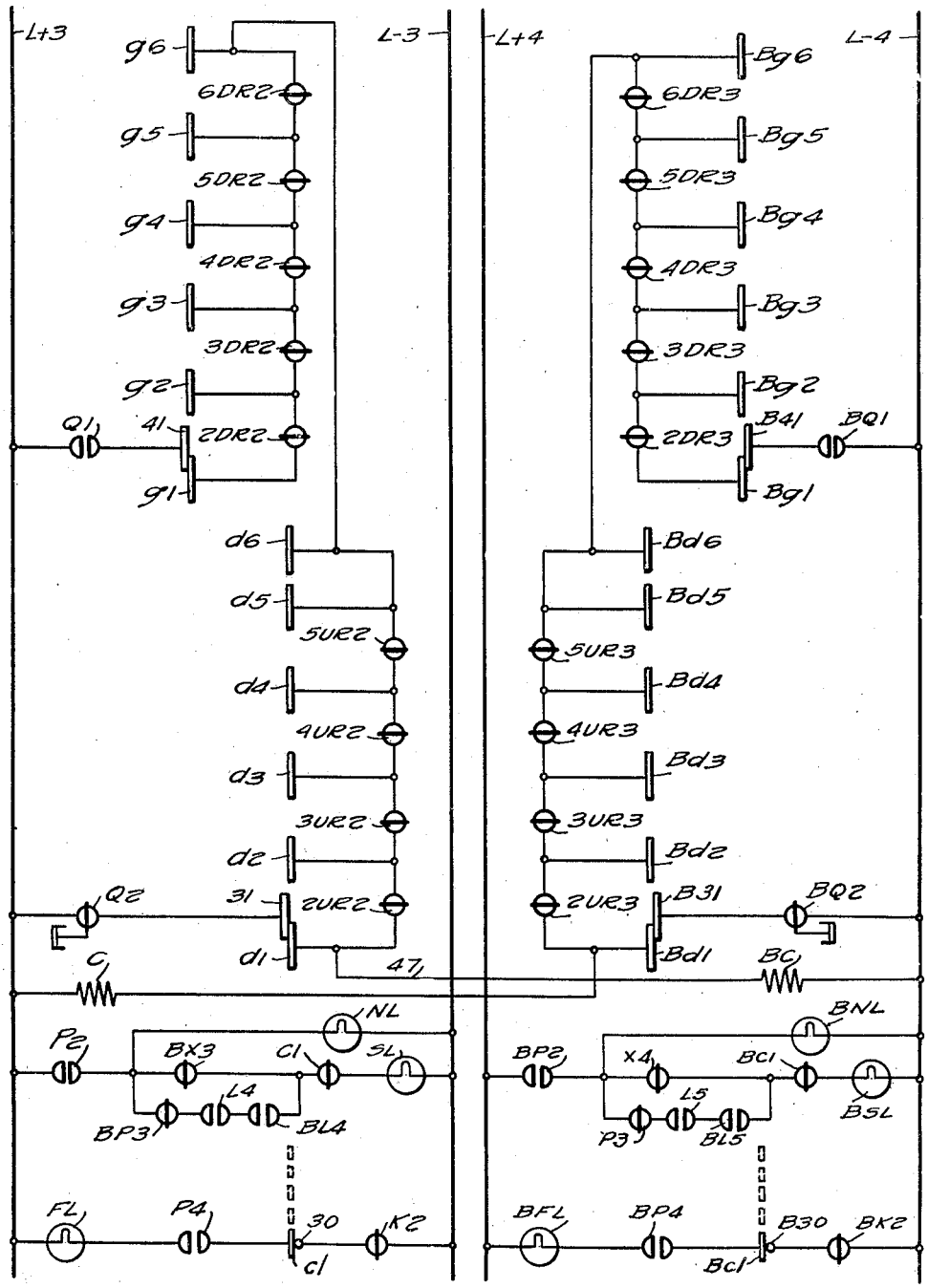
Figure 4A:
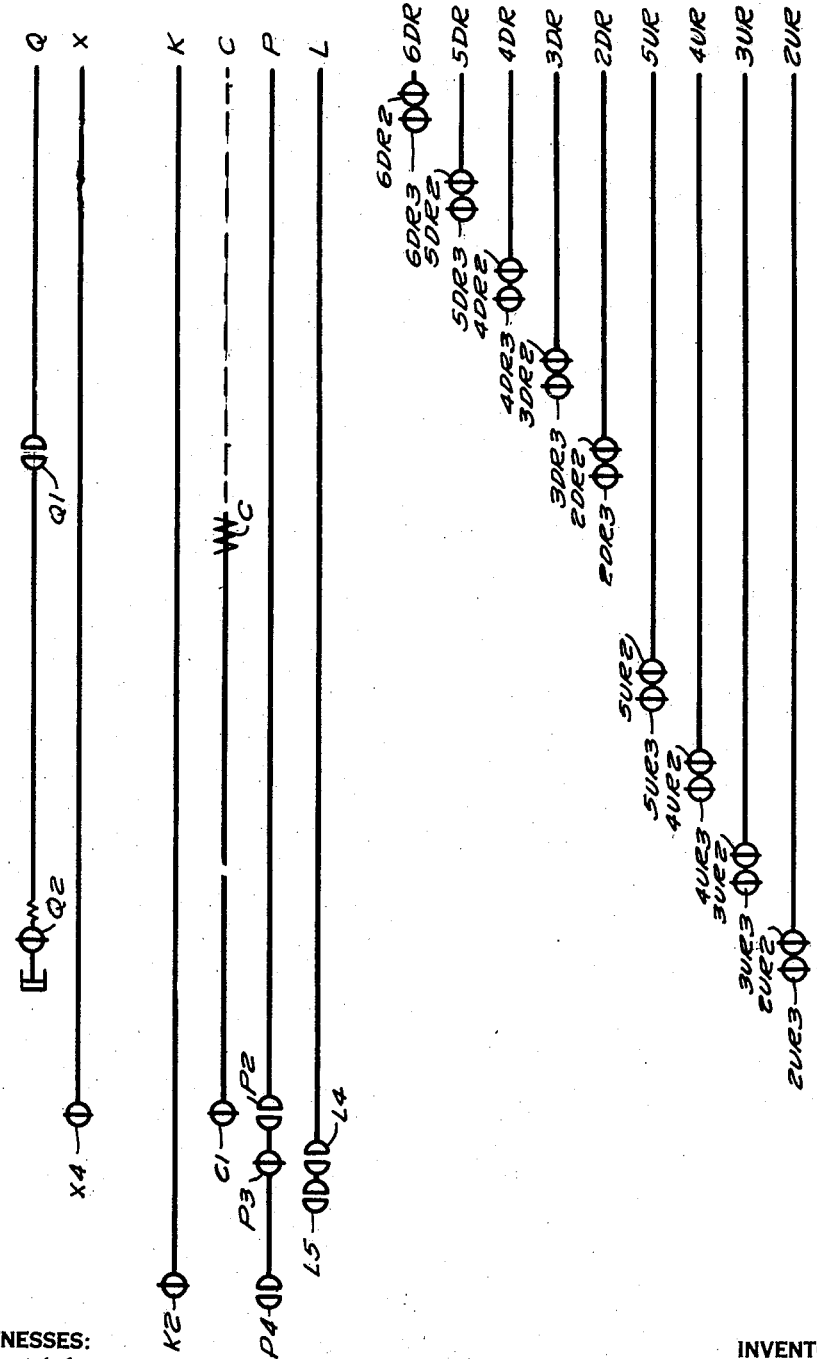

Figs. 3 and 4 embody a "straight line" representation of the wiring circuits for our improved dispatching system as applied to a full automatic control system; and Figs. 3A and 4A are key representations of the relays embodied in Fig. 3, illustrating the coils and contact members disposed in horizontal alignment with their positions in the "straight line" circuit, so that their locations therein may be readily determined.

Our invention is illustrated as applied to a full automatic control system similar to that illustrated and described in Patent No. 2,057,492 dated October 13, 1936, on Signal and control system for elevators. In the system of the patent the cars may be started by the operation of car switches disposed in the cars and may be stopped automatically at the various floors served by the registration of stop calls on push buttons in the cars and at the floor landings. However, the system here illustrated does not, for the sake of clearness, embody all the refinements of the system shown in the patent, but it will be understood that the invention may be easily applied to it and to many other types of elevator control systems.

Referring more particularly to the drawings, we have illustrated an elevator system embodying two cars A and B disposed for operation in suitable hatchways represented by the wall sections 10 for serving six floors. Car A and its control parts will be described in connection with reference characters and the similar parts for car B will be given the same reference characters with the prefix B.

List of relays individual to car A:

P   car selecting relay
X   up preference relay
Y   down preference relay
Q   auxiliary direction relay
C   call above relay
L   lower terminal relay
T   top terminal relay
K   door relay
NL   "next" lamp
SL   "start" lamp
FL   floor lantern
U   up direction switch
D   down direction switch
(car B has the same parts designated by "B")

Relays and buttons common to both cars:

5UR   up call registering relay for fifth floor
5DR   down call registering relay for fifth floor
5UW   up push button at fifth floor
5DW   down push button at fifth floor
(The other floors have the same arrangement of hall relays and push buttons.)

The car A may be suitably suspended in its hatchway by a cable 11 which passes over a hoisting drum 12 to a counterweight 13.

A car switch CS is mounted in car A for use by the attendant in starting and stopping the car. Inasmuch as car switches and their control connections are old and well known in the art, no further description thereof will be given.

An up direction relay switch U and a down direction relay switch D are connected in circuit with the contact points of the car switch CS. Movement of the car switch in counterclockwise direction will energize the up direction switch U to cause up operation of the car and movement of the car switch in clockwise direction will energize the down direction switch to cause down operation of the car. Centering the car switch will stop the car. However, it will be understood that usually car buttons are disposed in the car and hall push buttons are mounted at the landings for giving stop signals or actuating the stopping mechanism (not shown) to cause the car to stop.

Suitable stop buttons 14, one for each floor intermediate the lower and upper terminals, are mounted in car A to be operated by the attendant therein when he wants the car to stop at selected floors. Inasmuch as car buttons and their control circuits used in connection with the direction switches are well known in the art, no further description thereof will be given.

An up stop button and a down stop button are provided at each intermediate floor, with a down button at the top floor, in order that the waiting passengers at the floor landings may register stop calls to cause the cars to stop for them. The stop buttons at the floor landings are common to both cars and are designated as 2UW, 3UW, 4UW and 5UW for the up direction and 2DW, 3DW, 4DW, 5DW and 6DW for the down direction. It will be assumed that the terminals will be provided with the usual limit switches to automatically stop the cars as they approach and that the first floor will be the dispatching floor with the cars parked thereat when they are not answering calls. Therefore, no "up" or "down" buttons for the first floor and no "up" button for the sixth floor are provided.

Associated with the floor push buttons 2UW, 2DW, etc., are stop call registering relays 2UR, 3UR, 4UR and 5UR for the up direction, and 6DR, 5DR, 4DR, 3DR and 2DR for the down direction, so that the momentary pressing of a button at a floor will effect the registration of a stop call. Inasmuch as stop call registering relays and the stopping or signal systems controlled thereby are old and well known, no further description thereof will be given. However, if desired, further details thereof may be secured from the above-named Patent No. 2,057,492.

A cancellation coil is associated with each call registering relay for the purpose of deenergizing and restoring that relay when the call thereon is answered. The cancellation coils are designated as 2URN, 3URN, 4URN and 5URN for the up direction, and as 6DRN, 5DRN, 4DRN, 3DRN and 2DRN for the down direction.

A floor lantern FL is provided at the first floor landing for car A to indicate to waiting passengers when that car is ready for an up trip. Additional floor lanterns may be provided for the other floors, but they are not shown as they are not involved in our invention.

A door relay K controlled by the door contacts 15 is provided for extinguishing the floor lantern FL when the door (not shown) for car A is closed as that car leaves on a trip and also for controlling certain other relays.

A "next" signal device, such as a lamp NL, is disposed in car A to warn the attendant therein to get ready for a "start" or dispatching signal to start a trip.

A start or dispatching signal device, such as a starting lamp SL, is mounted in car A so that the attendant therein may be given a dispatching signal to start on a trip he has received a "next" signal to get ready for a trip.

A car selecting relay P is provided for car A for preparing the circuits of the floor lantern, the "next" lamp and the "start" lamp of that car for operation when that car is parked at the dispatching floor.

A call-above relay C responsive to operations of the call registering relays is associated with car A for assisting in controlling the operation of the dispatching signal means when stop calls are registered.

A lower terminal relay L is associated with car A and is responsive to the position of that car at the dispatching floor for assisting in controlling the dispatching signals. A top terminal relay T controlled by the arrival of the car at the top is provided for controlling a direction relay for car A.

An up direction preference relay X and a down direction preference relay Y are associated with car A for assisting in controlling the circuits for the dispatching signals. The relays X and Y are operated by the terminal relays of car A.

An auxiliary direction relay Q is associated with car A to assist in controlling the call-above relay BC of car B.

In order that the various circuits for the push buttons, signal devices, control relays, etc. may be connected for operation in accordance with the movements of the cars, each car is provided with a floor selector. The floor selector FS for car A is similar to those usually employed in elevator systems and may be located in any suitable place such as in the penthouse. The floor selector is provided with a plurality of stationary contact segments disposed to be engaged by suitable brushes mounted on a movable arm FSA. The movable arm is operated over the contact segments in accordance with the movements of the car by means of a screw shaft 20 which is rotated by a reduction gear 21 operated by a shaft 22 connected to the hoisting drum 12. Inasmuch as floor selectors of this type are old and well known in the art, no further description will be given.

The "up" contact segments c and their brush 30 are used in connecting the up floor lantern for car A. The contact segments e and their brush 32 are used for cancelling "up" stop calls registered on the hall floor buttons. The contact segments f and brush 42 cancel the down hall calls. The up contact segments d and the up brush 31 operated by car A are used for controlling the up portion of the circuit for the "call-above" relay BC for car B. The down contact segments g and their brush 41 operated by car A are used for controlling the down portion of the circuit for the relay BC for car B. The brushes 31 and 41 should be long enough to bridge the space between adjacent contacts so as to maintain their circuits. Other contact segments and brushes may be added as desired for controlling other features of the elevator system.

It is believed that the invention will be understood best by an assumed operation of the system illustrated in the drawings.

It will be assumed that the switches 18 (Fig. 3) have been closed thus energizing the control circuit, that both cars are at the lower terminal and that car A preceded car B to the terminal so that car A now has the "next" signal to leave. Under these conditions the up preference relay X, the lower terminal relay L, the auxiliary direction relay Q, the car selecting relay P, the call above relay C, the "next" lamp NL and the floor lantern FL for car A are energized ready for operation and also that the up preference relay BX, the lower terminal relay BL, the auxiliary direction relay BQ and the call above relay BC for car B are in an energized condition.

It will be assumed now that a waiting passenger at the third floor presses the down call button 3DW at that floor for a down trip. The temporary operation of the button 3DW energizes the down call registering relay 3DR to register a down stop call, by the circuit:

L+1, 3DW, 3DR, 45, 46, L—1

The energized relay 3DR thereupon closes its self holding contacts 3DR1 and opens its contacts 3DR2 and 3DR3. The opening of the contacts 3DR2 deenergizes the call above relay BC of car B and that relay closes its contacts BC1 in the circuit of the "start" lamp BSL for car B but no action results because the contacts BP2 and P3 in this circuit are open. The opening of the contacts 3DR3 in the circuit of the call above relay C for car A deenergizes that relay to reclose its back contact C1 thus energizing the "start" lamp SL in car A to indicate to the attendant therein that he should start his car on a trip. The circuit for the lamp SL extends:

L+3, P2, BP3, L4, BL4, C1, SL, L—3

The car is now ready for its up trip and it is assumed that the attendant therein closes the doors. The closing of the doors closes the door and safety contacts 15 thereby energizing the door relay K by the circuit:

L+1, 15, K, L—1

The energized relay K opens its contacts K1 and K2. The opening of the contacts K2 extinguishes the floor lantern FL for car A at the lower terminal. The opening of the contacts K1 deenergizes the car selecting relay P and the lower terminal relay L.

The deenergized relay L closes its back contacts L1 and opens its front contacts L2, L3, L4 and L5. The opening of the contacts L2 and L3 deenergizes the auxiliary direction relays Q and BQ of cars A and B. The deenergization of the relay BQ for car B recloses its back contacts BQ2 and opens its front contacts BQ1 thereby again energizing the call above relay C for car A.

The deenergized auxiliary direction relay Q for car A recloses its back contacts Q2 and opens its front contacts Q1 thereby energizing the call above relay BC of car B by the circuit L+3, Q2, 31, d1, 47, BC, L—4. The opening of the contacts BC1 prevents car B from receiving a starting signal until a call is registered behind car A.

At this point the attendant on car A starts that car upwardly by rotating the car switch CS in the counterclockwise direction to energize the up direction switch U by the circuit: L+1, CS, 48, U, L—1.

Returning now to the deenergization of the relay P by the action of the door relay K, the relay P closes its back contacts P1 and P3 and opens its front contacts P2 and P4. The opening of the contacts P2 extinguishes the "next" lamp NL and the "start" lamp SL in car A. The closing of the back contacts P1 energizes the car selecting relay BP of car B by the circuit:

L+2, BK1, B44, Bh1, P1, BP, L—2

The energized relay BP opens its back contacts BP1 and BP3 and closes its front contacts BP2 and BP4. The closing of the contacts BP2 energizes the "next" lamp BNL in car B thus giving the attendant in that car the "next" signal to get ready to start when he receives his starting signal. The circuit for lamp BNL extends:

L+4, BP2, BNL, L—4

The closing of the contacts BP4 energizes the floor lamp BFL at the first floor for car B by the circuit L+4, BFL, BP4, Bc1, B30, BK2, L—4

The lighting of the floor lantern for car B indicates to intending passengers at the lower terminal that car B will be the next to leave.

It will be assumed now that car A arrives at the top floor and the attendant centers his car switch for the stop at that floor. The attendant also opens the hatchway door (not shown), thus deenergizing the door relay K to close its back contact K1. The closing of the contacts K1 energizes the terminal relay T by the circuit:

L+1, K1, 44, h6, T, L—1

The energized top relay T opens its contacts T1 thus deenergizing the up direction relay X for car A which thereupon closes its back contacts X1 thus energizing the down direction relay Y for car A by the circuit:

L+1, U1, X1, L1, Y, L—1

The deenergized up direction relay X also closes its back contacts X2 thus energizing the auxiliary direction relay Q to close its down direction contacts Q1 and open its up contacts Q2 for controlling the circuit of the call above relay BC for car B. The contacts Q2 should be slow opening to permit contacts Q1 to close before Q2 opens so as to maintain relay BC energized while the change is made.

As the attendant in car A prepares to start down he closes the doors (not shown) thereby again energizing the door relay K to open the circuit to the brush 30 which would normally extinguish the floor lantern (not shown) for the top floor.

It will be assumed now that the attendant in car A moves his car switch CS in a clockwise direction thus energizing the down direction switch D to move the car downwardly, by the circuit:

L+1, CS, 49, D, L—1

It will be assumed now that the car A moves on down the hatchway until it arrives at the third floor where it stops in response to the down stop call registered on the call registering relay 3DR. In making the stop, the attendant centers the car switch thus deenergizing the car switch D, thereby closing the contacts D2 in the circuit for the brush 42 which energizes the cancelling coil 3DRN to restore the call registering relay 3DR to its normal and unoperated condition, through the circuit:

L+1, 3DR1, 3DRN, f3, 42, Y2, U2, D2, L—1

Also the attendant in car A opens the hatchway door (not shown) thereby opening the contacts 15 and deenergizing the door relay K. Car A is now stopped at the third floor with its doors open.

In the meantime car B has remained in the lower terminal with its "next" lamp BNL illuminated to indicate that it will be the next car to start from the lower terminal. Under these conditions it will be assumed that a waiting passenger at the fourth floor (which is now behind the direction of operation of car A) presses the button 4DW temporarily thereby energizing the down call registering relay 4DR to register a down call at the fourth floor by the circuit:

L+1, 4DW, 4DR, 45, 46, L—1

The energized relay 4DR closes its self-holding contacts 4DR1 and opens its contacts 4DR2 and 4DR3 in the circuits of the call above relays C and BC. The opening of the contacts 4DR3 does not affect the energized call above relay C of car A. However, the opening of the contacts 4DR2 opens the circuit for the relay BC and deenergizes that relay to cause it to close its back contacts BC1 thus energizing the "start" lamp BSL in car B by the circuit:

L+4, BP2, X4, BC1, BSL, L−4

The energized lamp BSL indicates to the attendant in car B that he is to start on his next trip.

In the meantime it will be assumed that the attendant in car A shuts the door (not shown) at the third floor and rotates his car switch in clockwise direction thus energizing the door relay K and the down switch D to continue the down trip of that car.

It will be assumed now that the attendant in car B prepares to start his car upwardly by closing his hatchway doors (not shown) thereby energizing the door relay BK by the circuit:

L+2, B15, BK, L−2

The energized relay BK opens its contacts BK1 and BK2 thereby deenergizing the floor lantern BFL for car B at the first floor, the car selecting relay BP and the lower terminal relay BL. The deenergized relay BP opens its contacts BP2 thus deenergizing the "next" lamp BNL and the "start" lamp BSL for car B. The attendant in car B now rotates the car switch BCS in a counterclockwise direction thereby energizing the up direction switch BU to start car B upwardly by the circuit:

L+2, BCS, 52, BU, L−2

Returning now to car A, it will be assumed that as this car nears the first floor the car attendant centers the car switch CS thus deenergizing the down direction switch D to stop the car. As the car stops, the attendant opens the hatchway door at the lower floor thus opening the safety contacts 15 and thereby deenergizing the door relay K. The deenergized relay K closes its back contacts K1 thereby energizing the car selecting relay P by the circuit:

L+1, K1, 44, h1, BP1, P, L−1

Inasmuch as the terminal relay L is in parallel with the relay B it is also energized.

The energized relay P closes its contacts P2 thus energizing the "next" lamp NL for car A by the circuit:

L+3, P2, NL, L−3

The energized relay P also closes its contacts P4 thus energizing the first floor lantern FL for car A by the circuit:

L+3, FL, P4, c1, 30, K2, L−3

The lighted lamp NL informs the attendant in car A that he will be the next to leave on a trip and the intending passengers will understand by the illumination of the floor lamp FL that car A is selected as the next car to go up. The energization of the terminal relay L opens its contacts L1 in the circuit of the down direction relay Y which is thereby deenergized to close its back contacts Y1, thus energizing the up direction relay X by the circuit:

L+1, D1, Y1, T1, X, L−1

The energized relay X opens its back contacts X2 thus deenergizing the auxiliary direction relay Q which closes its back contacts Q2 and opens its front contacts Q1 thus energizing the call above relay BC of car B to open its back contacts BC1 to prevent lighting of the "start" lamp BSL of car B until it has arrived at the lower floor, car A has left and a call has been registered behind car A.

Returning now to car B, it will be assumed that this car has arrived at the top floor, that the car switch BCS has been centered to deenergize the up direction switch BU and that the hatchway door (not shown) has been opened thereby deenergizing the door relay BK. The deenergized relay BK and the position of the car at the top floor energizes the top relay BT by the circuit:

L+2, BK1, B44, Bh6, BT, L−2

The energized relay BT opens its back contacts BT1 thus deenergizing the up direction relay BX which in turn closes its contacts BX1 thus energizing the down direction relay BY for car B by the circuit:

L+2, BU1, BX1, BL1, BY, L−2

The deenergization of the relay BX also closes its contact members BX2, thus energizing the auxiliary direction relay BQ by the circuit:

L+2, BX2, BQ, L−2

The energized relay BQ opens its front contacts BQ1 and closes its back contacts BQ2 to maintain energization of the call above relay C of car A so that if a call is registered back of car B it will give car A a "start" signal to proceed on a trip to answer the call back of car B. The relay C remains energized during the change in the contacts Q1 and Q2 because Q2 opens slowly.

It will be assumed now that the attendant in car B shuts the hatchway door (not shown) and rotates the car switch BCS in a clockwise direction thus energizing the down direction switch BP to move the car downwardly. The closing of the door closes the safety contacts B15 thereby energizing the door relay BK for the down trip and the car starts down.

It will be assumed now that car B approaches the down stop at the fourth floor and in doing so the attendant centers the car switch BCS and stops the car at the fourth floor and also opens the hatchway doors (not shown) at that floor. The opening of the doors deenergizes the door relay BK during the stop at the fourth floor.

As the car B moves down to the fourth floor stop and deenergizes its down direction switch BD it energizes the cancellation coil 4DRN to restore the call registering relay 4DR to its normal condition by the circuit:

L+1, 4DR1, 4DRN, 53, B/4,
B42, BY2, BU2, BD2, L−2

The attendant in car B resumes the down trip by closing the hatchway door and moving the car switch BCS to deenergize the down direction switch BD. As car B arrives at the first floor, the attendant centers the car switch BCS thus deenergizing the down direction switch BD. As the car stops at the first floor the attendant opens the hatchway door of that floor thus opening the contacts B15 to deenergize the door relay BK which closes its back contacts BK2 thus preparing the brush B30 of car B to energize the floor lamp BFL whenever the car selecting relay BP for car B is energized (which will not be until car A leaves the first floor). The deenergized door relay K closes its back contact BK1 thus energizing the lower terminal relay BL for car B through the circuit L+2, BK1, B41, Bh1, BL, L—2. The energized terminal relay BL opens its contact members BL1 thus deenergizing the down direction relay BY which in turn closes its back contacts BY1 thus energizing the up direction relay BX for car B.

Inasmuch as car A now has the "next" signal by the lighting of its "next" lamp NL, the car B will remain at the lower floor with no signals in operating condition until another call is registered above to give car A a "start" signal.

By the foregoing assumed operation it will be understood that we have provided a dispatching system for a pair of elevator cars which requires no timing device and which permits the cars to remain at the dispatching floor until a call for service is registered on one of the call buttons. It will be apparent that the attendants may accept passengers and leave the lower terminal any time they desire without causing any complication in the dispatching system. It will also be apparent that as soon as a call is registered for a floor behind a car already on a trip and which that car cannot answer, then a dispatching signal will be given to the car at the dispatching floor to cause it to leave immediately to take care of the call registered behind the car in operation.

Although we have illustrated and described only one specific embodiment of our invention, it is to be understood that changes therein and modifications thereof may be made without departing from the spirit and scope of the invention.

We claim as our invention:

1. An elevator system comprising a plurality of cars serving a plurality of landing floors including a dispatching floor, means responsive to operation of the cars for selecting the next car to be dispatched from the dispatching floor, a dispatching signal device for each car, a plurality of up and down call devices for registering calls for service at the floors, and means responsive to operation of any one of the call devices for operating the dispatching signal device for the car at the dispatching floor selected as the next car to leave the dispatching floor to give it a starting signal.

2. In a mechanism for giving signals to elevators to start them from a dispatching floor on a trip to answer calls for service, a signalling device for each car for advising the car attendant to start a trip, means responsive to a car being positioned at the dispatching floor for partially completing a circuit for energizing its signal device, a plurality of call devices for registering calls for service at the floors, means responsive to operation of a call registering device for completing said partially completed circuit to the last-named signal device, means for preventing the energization of more than one signal device in the event that more than one car is at the dispatching floor, and means responsive to the operation of an additional call registering device for a floor behind the motion of said first named car on its trip for completing the circuit for a second car signal device.

3. In a mechanism for giving signals to elevators to start them from a dispatching floor on a trip to answer calls for service, a signalling device for each car for advising the car attendant to start a trip, means responsive to a car being positioned at the dispatching floor for partially completing a circuit for energizing its signal device, a plurality of call devices for registering calls for service at the floors, means responsive to operation of a call registering device for completing said partially completed circuit to the last-named signal device, means for preventing the energization of more than one signal device in the event that more than one car is at the dispatching floor, means responsive to the operation of an additional call registering device for a floor behind the motion of said first named car on its trip for completing the circuit for a second car signal device, and means responsive to up motion of the first mentioned car for preventing the closing of the signal device circuit for the second car until said first car starts its down trip.

4. An elevator system comprising two cars serving a plurality of floors including a dispatching floor, a "next" signal device for each car, means responsive to the presence of one or both cars at the dispatching floor for operating the "next" signal device of a car at the dispatching floor to indicate that it will be the next car to start a trip, a "start" signal device for each car, a plurality of up and down call devices for registering calls for service at the floors, means responsive to the operation of any call device for operating the "start" signal device for the car with the operated "next" signal device to give it a signal to start on its trip, and means responsive to that car starting on its trip from the dispatching floor for preventing operation of the "start" signal device on the other car in response to the operation of a call device for a floor ahead of the car on its trip.

5. An elevator system comprising two cars serving a plurality of floors including a dispatching floor, a floor lantern at the dispatching floor for each car, a "next" signal device for each car, means responsive to the arrival of one or both of the cars at the dispatching floor for operating the "next" signal device and the floor lantern of a car at the dispatching floor to indicate that it will be the next car to start on a trip, a "start" signal device for each car, a plurality of call devices for registering calls for service at the floors, means responsive to operation of a call device for operating the "start" signal device of the car having the operated "next" signal device to give it a starting signal, a door-operated means responsive to closing the door of the car having the starting signal for extinguishing its floor lantern, and means responsive to the departure of that car for restoring its "start" signal device to normal condition.

6. An elevator system comprising two cars serving a plurality of landing floors including a dispatching floor, a "next" signal device for each car, means responsive to the presence of the cars at the dispatching floor for operating the "next" signal device of one of the cars to indicate that it will be the next car to start a trip, a "start" signal device for each car, a plurality of up and down call devices for registering calls for service at the floors, means responsive to operation of an up or a down call device for operating the "start" signal device of the car having its "next" signal device operated to give it a starting signal, and means responsive to movement of that car on its trip for preventing operation of the "start" signal device of the other car in response to operation of any call device for any floor ahead of the car on its trip.

7. An elevator system comprising two cars serving a plurality of landing floors including a dispatching floor, a "next" signal device for each car, means responsive to the presence of the cars at the dispatching floor for operating the "next" signal device of one of the cars to indicate that it will be the next car to start a trip, a "start" signal device for each car, a plurality of call devices for registering calls for service at the floors, means responsive to operation of a call device for operating the "start" signal device of the car having its "next" signal device operated to give it a starting signal, and means responsive to movement of that car on its trip for causing the operation of a call device for a stop at a floor behind it on its trip to operate the "start" signal device of the car remaining at the dispatching floor.

8. An elevator dispatching system comprising a pair of cars serving a plurality of landing floors including a dispatching floor, a "next" signal device for each car, a selecting relay for each car, means responsive to the unoperated condition of the selecting relay of one of the cars and to the position of the other car at the dispatching floor for operating the selecting relay of said other car, means responsive to operation of the selecting relay of a car for operating the "next" signal device of that car to give it a "next car to leave" signal, a dispatching signal device for each car, a plurality of call devices for registering calls for service at the floors, a call-above relay for each car, means responsive to operation of one or more of the call registering devices for operating the call-above relay of the next to start car, and means responsive to operation of the call-above relay of the next to start car for operating the dispatching signal device of that car to give it a dispatching signal.

9. An elevator dispatching system comprising a pair of cars serving a plurality of landing floors including a dispatching floor, a "next" signal device for each car, means responsive to the arrival of the cars at the dispatching floor for operating the "next" signal device of one of the cars to indicate that it should be the next car to leave the dispatching floor, a plurality of call devices for registering stop calls for the floors, an energized call above circuit for each car, means responsive to operation of a call device for deenergizing the call above circuit of one of the cars, a "start" signal device for each car, and means responsive to the deenergization of the call above circuit of said one of the cars for operating the "start" signal device of the car having the operated "next" signal device to give it a starting signal.

10. An elevator dispatching system comprising a pair of cars serving a plurality of landing floors including a dispatching floor, a "next" signal device for each car, a selecting relay for each car, means responsive to the unoperated condition of the selecting relay of one of the cars and to the position of the other car at the dispatching floor for operating the selecting relay of said other car, means responsive to operation of the selecting relay of a car for operating the "next" signal device of that car to give it a "next car to leave" signal, a dispatching signal device for each car, a plurality of call devices for registering calls for service at the floors, a call-above relay for each car, means responsive to operation of one or more of the call registering devices for operating the call-above relay of the next to start car, and means responsive to operation of the call-above relay of the next to start car for operating the dispatching signal device of that car to give it a dispatching signal, an up direction and a down direction preference relay for each car for biasing it to continue in the direction in which it starts a trip, a dispatching terminal relay for each car, means responsive to the position of a car at the dispatching floor for operating its dispatching terminal relay, and means responsive to the unoperated condition of a dispatching terminal relay and to the operated condition of the up direction preference relay of a car away from the dispatching floor for preventing operation of the dispatching signal of the other car in response to operation of a call device for a floor ahead of the car away.

11. An elevator dispatching system comprising a pair of cars serving a plurality of landing floors including a dispatching floor, a "next" signal device for each car, a selecting relay for each car, means responsive to the unoperated condition of the selecting relay of one of the cars and to the position of the other car at the dispatching floor for operating the selecting relay of said other car, means responsive to operation of the selecting relay of a car for operating the "next" signal device of that car to give it a "next to leave" signal, a floor lantern for each car, an up direction preference relay for each car to be operated when that car is conditioned for up operation; means responsive to operation of the selecting relay of a car, to the presence of that car at the dispatching floor and to the open position of a door to that car for operating its floor lantern to indicate to waiting passengers that it will be the next car to leave the dispatching floor; a dispatching signal device for each car, a plurality of call devices for registering calls for service at the floors, a call-above relay for each car, means responsive to operation of one or more of the call registering devices for operating the call-above relay of the car selected to start next, and means responsive to operation of the call-above relay of the car selected to start next for operating its dispatching signal device to give it a dispatching signal.

HAROLD W. WILLIAMS.
MARK L. MOUNT.
ARVID M. NELSON.